April 25, 1939.  A. L. FREEDLANDER ET AL  2,155,703
GENERATOR DRIVE
Filed April 29, 1937   2 Sheets-Sheet 1
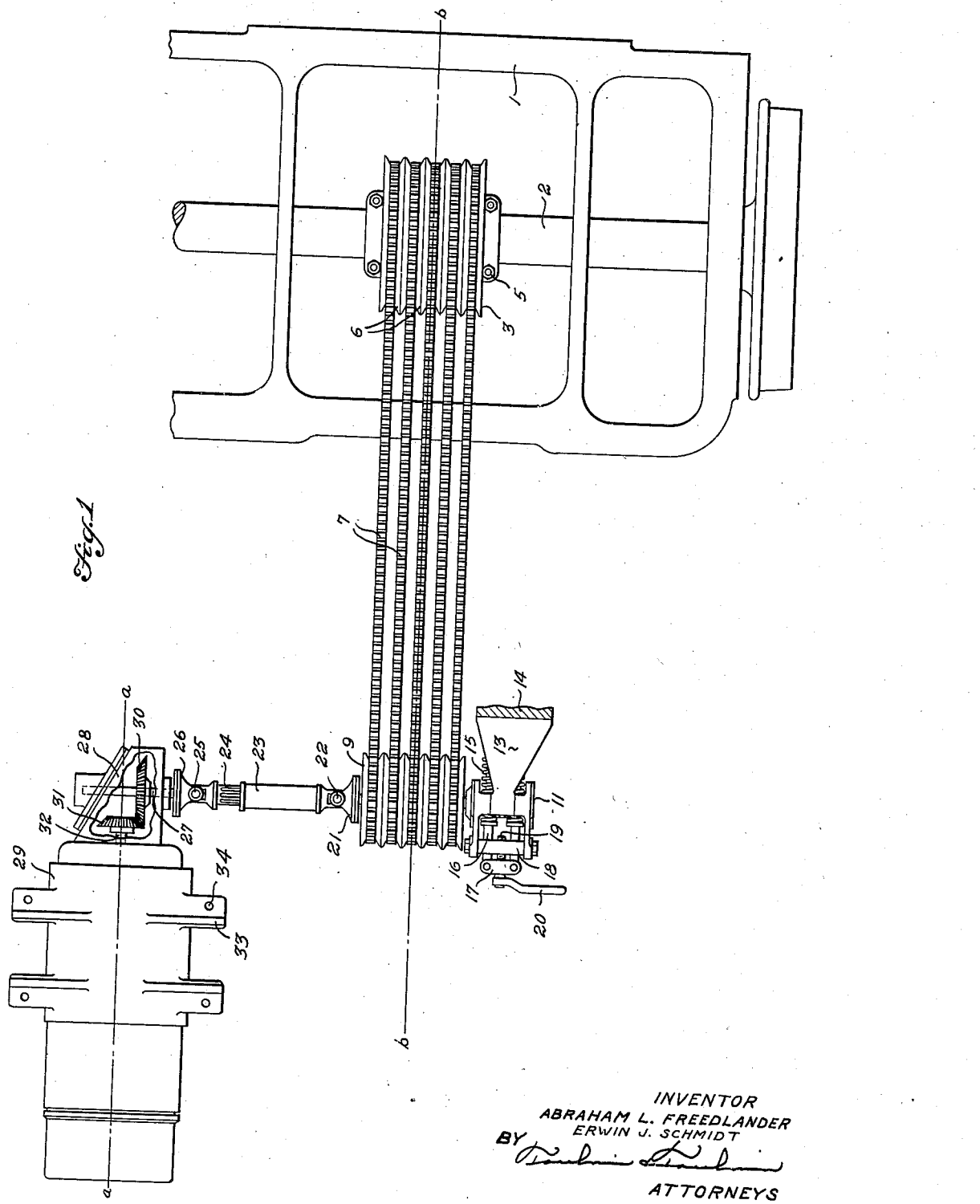
INVENTOR
ABRAHAM L. FREEDLANDER
ERWIN J. SCHMIDT
BY
ATTORNEYS April 25, 1939. A. L. FREEDLANDER ET AL 2,155,703
GENERATOR DRIVE
Filed April 29, 1937  2 Sheets-Sheet 2
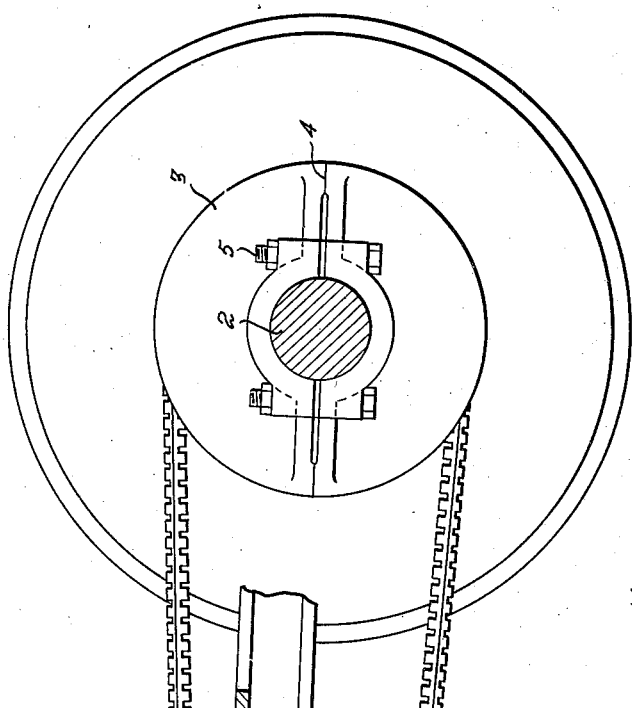
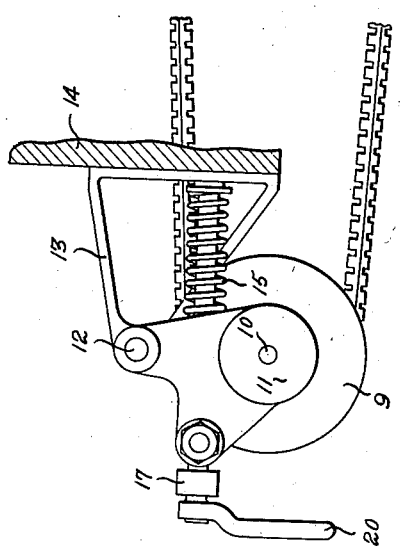
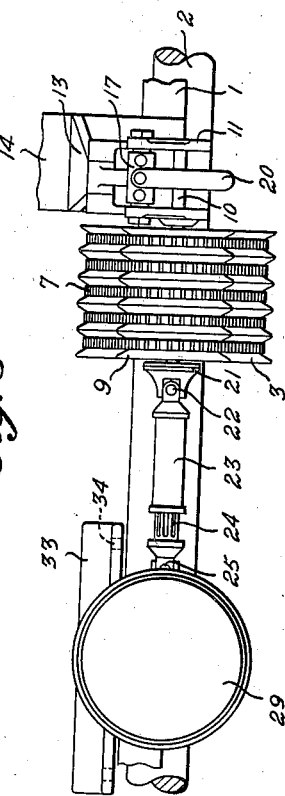
INVENTOR
ABRAHAM L. FREEDLANDER
ERWIN J. SCHMIDT
BY
ATTORNEYS Patented Apr. 25, 1939

2,155,703

UNITED STATES PATENT OFFICE 2,155,703

GENERATOR DRIVE

Abraham L. Freedlander, Dayton, Ohio, and Erwin J. Schmidt, New York, N. Y., assignors to The Dayton Rubber Manufacturing Company, Dayton, Ohio, a corporation of Ohio Application April 29, 1937, Serial No. 139,781

1 Claim. (Cl. 105—106)

Our invention relates to generator drives for vehicles, and in particular, for rail vehicles.

It is our object to provide a generator drive for a railway vehicle which permits of the swinging of the truck, without varying the tension on the belts in the drive, and without interfering with the driving of the generator.

It is a further object of our invention to provide a drive in which the generator can be located accessibly on the under side of the car, adjacent one side thereof, if desired, and with no disturbance of the driving of the generator due to the swinging of the truck.

It is a further object to provide a generator drive in which there is a built-in head gear box on the generator, which is unitary with the generator and in positive and permanent alignment therewith, and so arranged that the generator speed may be increased by the gearing so as to reduce the size of the generator and the size of the generator drive, with resulting savings in cost.

In the drawings:

Figure 1 is a plan view of the generator drive.

Figure 2 is a side elevation thereof.

Figure 3 is an end elevation from the left-hand side of Figure 1.

Referring to the drawings in detail, the numeral 1 represents a truck frame having axles 2 supported in the frame. Mounted on one of these axles is a multiple groove driving pulley 3. This pulley is split transversely, as at 4, and held together by the usual bolts 5. There is supported in these multiple grooves 6 of the pulley 3 the multiple V-belts 7, the ends of which are connected by the connectors 8. These belts are, in turn, mounted upon the driven pulley 9 that is supported on the axle 10 between the depending ears 11, on a yoke that is pivotally supported at 12 on a bracket 13, which in turn, is mounted on the under side of the car body, preferably on a transverse frame member 14. Between the swinging yoke 11 and the bracket 13 is a pair of helical springs 15, the compression of which is varied by the plungers 16, which are carried in the yoke 17. These plungers are slidably mounted in the cross member 18 of the yoke 11. In this cross member is an adjusting bolt 19 that is threaded therein. This bolt is also mounted in the yoke 17, and is provided with a handle 20 so that by adjusting the distance of the yoke 17 from the cross member 18, the compression of the springs will be adjusted. This, in turn, will adjust the tension of the belts 7.

The pulley 9 is connected to a driving head 21, which in turn, is pivotally connected at 22 to an internally splined sleeve 23 adapted to receive a reciprocating splined shaft 24, which is pivoted at 25 to a driven head 26 mounted on the end of a shaft 27, which is journalled at either end in a gear box casing 28 mounted on one end of the generator 29. This shaft 27 carries a bevel gear 30, which meshes with a bevel pinion 31 on the armature shaft 32 of the generator. The generator is mounted by brackets 33 on the under side of the car frame by bolts passing through the bolt holes 34.

It will be noted that the axis of the generator a—a is parallel with the axis of the car, with the center line of the car engaged at b—b. As the truck swings the driven pulley will be moved against the springs 15, which resist that movement and maintain the belt 7 uniformly taut. When this takes place there is a change of the distance between the pivots 22 and 25, which causes a lengthening or shortening of the splined connection 23—24. By employing a built-on gear box, with gears and shafts supported in the gear box in permanent alignment, these swinging, compensating movements may take place without disturbing the generator. By utilizing a gear box the speed of the generator can be increased and the size of the drive and of the generator decreased, with corresponding economies in first costs and in operation. With this arrangement the generator may be placed beneath the car, closely adjacent one side of the bottom thereof, so as to be readily inspected for adjustment and repair, as well as oiling. Any wear or lengthening of the belts may be immediately adjusted by actuating the handle 20.

It will be understood that we desire to comprehend within our invention such modifications as come within the scope of the claim and the invention.

Having thus fully described our invention, what we claim as new and desire to secure by Letters Patent, is:

In combination, a car body adapted to be pivotally supported upon a car truck, a multiple V-belt drive comprising a driving pulley, a driven pulley and multiple V-belts; an axle and wheels for said truck, said axle supporting the driving pulley aforesaid; means for swingingly and yieldingly supporting said driven pulley, remote from said truck, upon the car body and normally with its axis parallel with that of the driving pulley, a generator arranged parallel with the longitudinal axis of the car, a right angle gear box and gear drive mounted on the head of said generator, and telescoping means adapted to connect said gear box drive with said driven pulley.

ABRAHAM L. FREEDLANDER.
ERWIN J. SCHMIDT.